(12) United States Patent
Bakatsias et al.

(10) Patent No.: US 9,575,277 B2
(45) Date of Patent: Feb. 21, 2017

(54) FIBER OPTIC CABLE BREAKOUT ASSEMBLY

(71) Applicant: RAYCAP, S.A., Athens (GR)

(72) Inventors: Konstantinos Bakatsias, Athens (GR); Charis Coletti, Athens (GR); Fani Asimakopoulou, Athens (GR)

(73) Assignee: Raycap, S.A., Athens (GR)

( * ) Notice: Subject to any disclaimer, the term of this patent is extended or adjusted under 35 U.S.C. 154(b) by 0 days.

(21) Appl. No.: 14/598,048

(22) Filed: Jan. 15, 2015

(65) Prior Publication Data

US 2016/0209615 A1    Jul. 21, 2016

(51) Int. Cl.
*G02B 6/28* (2006.01)
*G02B 6/44* (2006.01)

(52) U.S. Cl.
CPC ........ *G02B 6/4471* (2013.01); *G02B 6/4472* (2013.01)

(58) Field of Classification Search
CPC . G02B 6/2938; G02B 6/29395; G02B 6/3894; H04J 14/02
USPC ........ 385/24, 48, 39, 87, 136, 100, 134, 137
See application file for complete search history.

(56) References Cited

U.S. PATENT DOCUMENTS

| | | |
|---|---|---|
| 3,165,372 A | 1/1965 | Jacobs |
| 3,781,461 A * | 12/1973 | Thompson ........... H02G 15/105 174/138 F |
| 3,976,351 A | 8/1976 | Hopfe |
| 4,030,061 A | 6/1977 | Gaskell |
| 4,236,190 A | 11/1980 | Hollingsead |
| 4,918,565 A | 4/1990 | King |
| 4,976,508 A | 12/1990 | Okura |
| 5,030,128 A | 7/1991 | Herron |
| 5,311,397 A | 5/1994 | Harshberger |
| D361,314 S | 8/1995 | Ryan |
| D362,232 S | 9/1995 | Ryan |
| 5,473,718 A | 12/1995 | Sommer |

(Continued)

FOREIGN PATENT DOCUMENTS

| | | |
|---|---|---|
| DE | 20 2005 021740 U1 | 8/2009 |
| DE | CH698717 B1 | 10/2009 |

(Continued)

OTHER PUBLICATIONS

"Relay" from Wikipedia. Downloaded Oct. 30, 2009.

(Continued)

*Primary Examiner* — Ellen Kim
(74) *Attorney, Agent, or Firm* — Schwabe Williamson & Wyatt, PC (57) ABSTRACT

A breakout assembly includes a housing including a first end and a second end. A retaining member includes a first end configured to receive a fiber optic cable and a second end attaching to the first end of the housing and retaining exposed stripped layers of the fiber optic cable. A breakout head is configured to insert into the second end of the housing and includes holes for receiving furcation tubes. A nut holds the breakout head inside of the second end of the housing. Different optical fibers from the fiber optic cable are inserted into the furcation tubes and held by the breakout head. An outside surface of the breakout head and an inside surface of the second end of the housing have round side surfaces extending between flat top and bottom surfaces that prevent the breakout head from rotating within the housing.

22 Claims, 10 Drawing Sheets

(56) References Cited

U.S. PATENT DOCUMENTS

| | | | |
|---|---|---|---|
| 5,491,766 A * | 2/1996 | Huynh | G02B 6/00 385/100 |
| 5,530,215 A | 6/1996 | Couvreur | |
| 5,555,153 A | 9/1996 | Frederiksen | |
| 5,602,532 A | 2/1997 | Ryan | |
| 5,627,721 A | 5/1997 | Figueiredo | |
| 5,651,698 A | 7/1997 | Locati | |
| 5,701,227 A | 12/1997 | Ryan | |
| 5,790,360 A | 8/1998 | Ryan | |
| 5,903,693 A | 5/1999 | Brown | |
| 5,914,845 A | 6/1999 | Chase | |
| 5,953,193 A | 9/1999 | Ryan | |
| 5,966,282 A | 10/1999 | Ryan | |
| 5,969,932 A | 10/1999 | Ryan | |
| 6,031,706 A | 2/2000 | Nabell | |
| 6,038,119 A | 3/2000 | Atkins | |
| 6,074,247 A | 6/2000 | Hall | |
| 6,114,632 A | 9/2000 | Planas, Sr. | |
| 6,122,156 A | 9/2000 | Nabell | |
| 6,389,214 B1 * | 5/2002 | Smith | G02B 6/4472 385/136 |
| 6,430,020 B1 | 8/2002 | Atkins | |
| 6,535,369 B1 | 3/2003 | Redding | |
| 6,556,402 B2 | 4/2003 | Kizis | |
| 6,623,315 B1 | 9/2003 | Roderick | |
| 6,654,223 B1 | 11/2003 | Bippus | |
| 6,719,615 B1 | 4/2004 | Molnar | |
| 6,729,902 B2 | 5/2004 | Martich | |
| 6,738,555 B1 * | 5/2004 | Cooke | G02B 6/4471 385/136 |
| 6,771,861 B2 | 8/2004 | Wagner | |
| 6,851,966 B1 | 2/2005 | Tomasino | |
| 6,876,533 B1 | 4/2005 | Ryan | |
| 7,008,256 B2 | 3/2006 | Poiraud | |
| 7,035,073 B2 | 4/2006 | Bennett | |
| 7,228,047 B1 | 6/2007 | Szilagyi | |
| 7,270,485 B1 * | 9/2007 | Robinson | G02B 6/4477 385/136 |
| 7,397,673 B1 | 7/2008 | Wilson | |
| 7,433,169 B2 | 10/2008 | Kamel | |
| 7,664,363 B1 * | 2/2010 | Mowery, Sr. | G02B 6/3887 385/137 |
| 7,768,794 B1 | 8/2010 | Wilson | |
| 7,946,863 B2 | 5/2011 | Loch | |
| 7,972,067 B2 * | 7/2011 | Haley | G02B 6/3879 385/139 |
| 8,021,189 B2 | 9/2011 | Zayas | |
| 8,279,067 B2 * | 10/2012 | Berger | H04W 60/00 340/539.13 |
| 8,457,461 B2 * | 6/2013 | Ott | G02B 6/2558 385/103 |
| 8,467,655 B2 | 6/2013 | German | |
| 8,490,799 B2 | 7/2013 | Knight | |
| 8,526,200 B2 | 9/2013 | Miller | |
| 8,730,639 B1 | 5/2014 | Wilson | |
| 8,780,519 B2 | 7/2014 | Miller | |
| 8,810,990 B1 | 8/2014 | Miller | |
| 8,831,395 B2 * | 9/2014 | Sievers | G02B 6/4439 385/135 |
| 8,839,594 B2 * | 9/2014 | Smith | H02G 3/083 174/50 |
| 8,873,926 B2 * | 10/2014 | Beamon | G02B 6/4248 385/134 |
| 8,995,106 B2 | 3/2015 | Miller | |
| 9,057,862 B2 * | 6/2015 | Strasser | G02B 6/4471 |
| 9,099,860 B2 | 8/2015 | Martinez | |
| 9,140,872 B2 * | 9/2015 | Sedor | G02B 6/4472 |
| 9,383,521 B2 * | 7/2016 | Dendas | G02B 6/4471 |
| 2001/0053971 A1 | 12/2001 | Demetrescu | |
| 2002/0055306 A1 | 5/2002 | Jenks | |
| 2002/0196593 A1 | 12/2002 | Kizis | |
| 2003/0027521 A1 | 2/2003 | Yip | |
| 2003/0148668 A1 | 8/2003 | Lias | |
| 2004/0119386 A1 | 6/2004 | Guidez | |
| 2004/0198451 A1 | 10/2004 | Varghese | |
| 2004/0246693 A1 | 12/2004 | Lloyd | |
| 2005/0036262 A1 | 2/2005 | Siebenthall | |
| 2005/0042920 A1 | 2/2005 | Poiraud | |
| 2005/0157461 A1 | 7/2005 | Cauthron | |
| 2006/0139836 A1 | 6/2006 | Anthony | |
| 2006/0153362 A1 | 7/2006 | Bloodworth | |
| 2007/0163801 A1 | 7/2007 | Coffey | |
| 2007/0217101 A1 | 9/2007 | Carter | |
| 2008/0037188 A1 | 2/2008 | Wilson | |
| 2008/0117555 A1 | 5/2008 | Wilson | |
| 2008/0139045 A1 | 6/2008 | Ho | |
| 2008/0186667 A1 | 8/2008 | Verdelli | |
| 2008/0278889 A1 | 11/2008 | Briggs | |
| 2008/0310060 A1 | 12/2008 | Metral | |
| 2009/0103218 A1 | 4/2009 | Ryan | |
| 2009/0103881 A1 * | 4/2009 | Gonzalez | G02B 6/4477 385/137 |
| 2010/0034507 A1 | 2/2010 | Sielaff | |
| 2010/0054676 A1 * | 3/2010 | Cooke | G02B 6/4471 385/100 |
| 2010/0259871 A1 | 10/2010 | Ewing | |
| 2011/0135316 A1 | 6/2011 | Fankhauser | |
| 2012/0051710 A1 * | 3/2012 | Zeng | G02B 6/4472 385/137 |
| 2012/0092835 A1 | 4/2012 | Miller | |
| 2012/0200978 A1 | 8/2012 | Miller | |
| 2012/0200979 A1 | 8/2012 | Miller | |
| 2012/0230636 A1 * | 9/2012 | Blockley | G02B 6/4471 385/59 |
| 2012/0319485 A1 | 12/2012 | Ewing | |
| 2013/0146355 A1 | 6/2013 | Strasser | |
| 2013/0170801 A1 * | 7/2013 | Do | G02B 6/4416 385/101 |
| 2013/0294735 A1 | 11/2013 | Burris | |
| 2013/0340361 A1 | 12/2013 | Rogers | |
| 2014/0168842 A1 | 6/2014 | Martinez | |
| 2015/0003790 A1 * | 1/2015 | Wu | G02B 6/3887 385/81 |
| 2015/0109710 A1 | 4/2015 | Politis | |
| 2015/0155706 A1 | 6/2015 | Miller | |

FOREIGN PATENT DOCUMENTS

| | | |
|---|---|---|
| EP | 1 855 365 A1 | 11/2007 |
| EP | 2 469 661 | 6/2012 |
| EP | 2 469 661 A1 | 6/2012 |
| GB | 2421641 A | 6/2006 |
| JP | 2005 317472 A | 11/2005 |
| WO | 2006/076120 A1 | 7/2006 |
| WO | 2008/059212 A1 | 5/2008 |
| WO | 2012/108929 A1 | 8/2012 |
| WO | 2012/108930 A1 | 8/2012 |
| WO | 2013/165657 | 11/2013 |
| WO | 2013/165657 A1 | 11/2013 |

OTHER PUBLICATIONS

Written Opinion for PCT/US11/064704; Date of mailing: May 16, 2012.

Written Opinion for PCT/US11/064717; Date of mailing: May 16, 2012.

International Search Report for PCT/US11/064704; Date of mailing: May 16, 2012.

International Search Report for PCT/US11/064717: Date of mailing: May 16, 2012.

Preliminary Report on Patentablity and Written Opinion of the International Searching Authority for PCT/US2011/064717; Date of mailing Aug. 13, 2013.

Preliminary Report on Patentablity and Written Opinion of the International Searching Authority for PCT/US2011/064704; Date of mailing Aug. 13, 2013.

Stolowitz Ford Cowger LLP, Listing of Related Cases dated Jan. 2015; 2 pages.

* cited by examiner

FIBER OPTIC CABLE BREAKOUT ASSEMBLY

BACKGROUND

Latest generation wireless communications systems, referred to as distributed antenna systems (DAS), distributed DC radio systems, remote radio heads (RRH), 4G and long term evolution (LTE) cellular communication systems, now commonly locate radios next to the antennas on towers outside of communications shelters. In these next-generation facilities, the baseband unit (BBU) module that controls the radio traffic is still located at the ground level shelter, but the actual radios are separated from the controllers up to several hundred feet and controlled via fiber optic links. In order to avoid individual fiber cables running up the tower to each remote radio unit (RRU), a single, large multi-fiber optic cable may be used to operate individual RRUs. This configuration divides the multi-fiber trunk cable into individual optical fibers running to the RRUs.

DETAILED DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
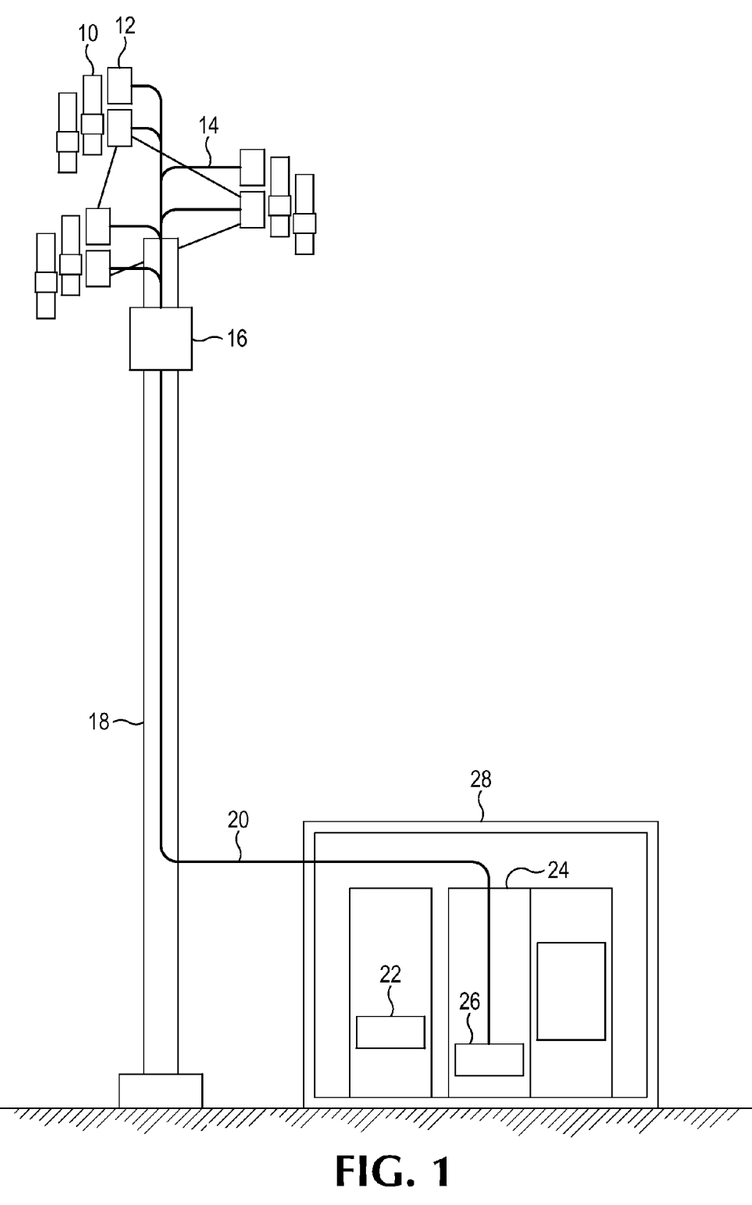
FIG. 1 shows a remote radio head-based wireless communication system.

Referring to FIG. 1, a building 28 contains a communication station 24 that includes a baseband unit (BBU) 26. BBU 26 is connected through one or more fiber optic cables 20 to different remote radio units (RRUs) 12 located on the top of a tower 18. Radios 12 are connected to associated antennas 10. Fiber optic cables 20 are alternatively referred to as multi-fiber cables, trunk cables, or cables 20.

A Direct Current (DC) power plant 22 is connected through DC power cables (not shown) to different radios 12 on tower 18. In another configuration, radios 12 and associated antennas 10 are located at different corners on the roof of a building. Fiber optic cable 20 connect to the different radios 12 and run into the building and connect to communication station 24 located within a room of the building. Of course radios 12 may be located in any location and connected to fiber optic cable 20 in any variety of different configurations.

A distribution box 16 is attached to the top of tower 18 and is connected to the distal end of fiber optic cable 20 proximate to radios 12 and antennas 10. Distribution box 16 contains a breakout assembly that separates optical fiber lines in cable 20 for connecting to radios 12 through fiber jumpers 14.

In one embodiment distribution box 16 also may contain surge suppression devices and receive the power cables connected to power plant 22. Distribution box 16 may connect different power lines in the power cable to the surge suppression devices and connect power jumpers from the surge suppression devices to radios 12. Example dual power and fiber optic distribution boxes are described in U.S. patent application Ser. No. 13/301,720, filed Nov. 21, 2011; and U.S. patent application Ser. No. 14/101,231, filed Dec. 9, 2013 which are both herein incorporated by reference in their entirety.

Figure 2:
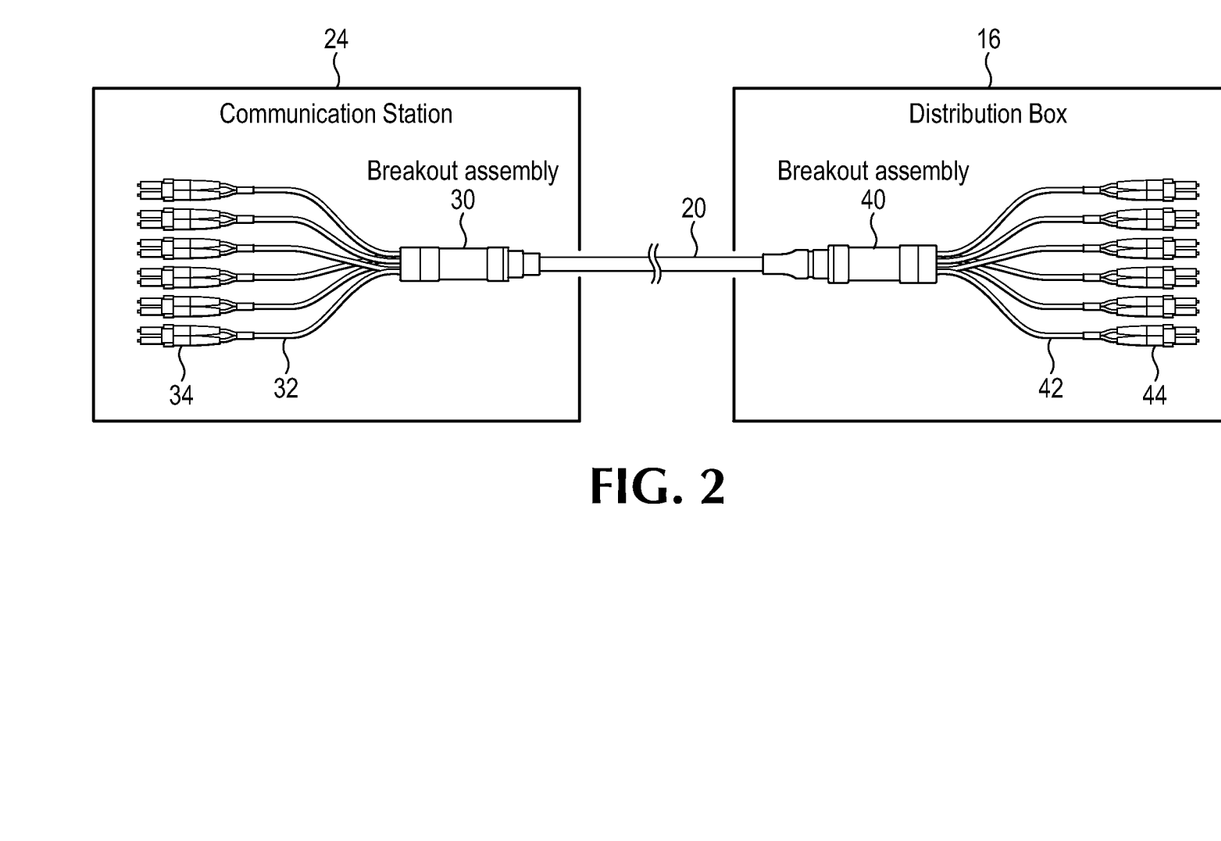
FIG. 2 shows breakout assemblies used with a multi-fiber cable.

FIG. 2 shows in more detail fiber optic cable 20. A first breakout assembly 30 is connected to a first end of fiber optic cable 20 and located within communication station 24 of building 28 shown in FIG. 1. Breakout assembly 30 separates out the optical fibers from cable 20 and feeds the optical fibers through furcation tubes 32 that terminate at fiber optic connectors 34. Connectors 34 connect with different communication devices within BBU 26 shown above in FIG. 1.

A second breakout assembly 40 is connected to a second end of fiber optic cable 20 and is located within distribution box 16 attached to the top of tower 18 as shown in FIG. 1. Breakout assembly 40 separates out optical fibers from trunk cable 20 and feeds the optical fibers through furcation tubes 42 that terminate at fiber optic connectors 44. Connectors 44 connect with different fiber jumpers 14 that connect to different radios 12 as shown above in FIG. 1. Breakout assembly 30 and breakout assembly 40 are substantially the same. Accordingly, only breakout assembly 40 is described in detail below.

Figure 3:
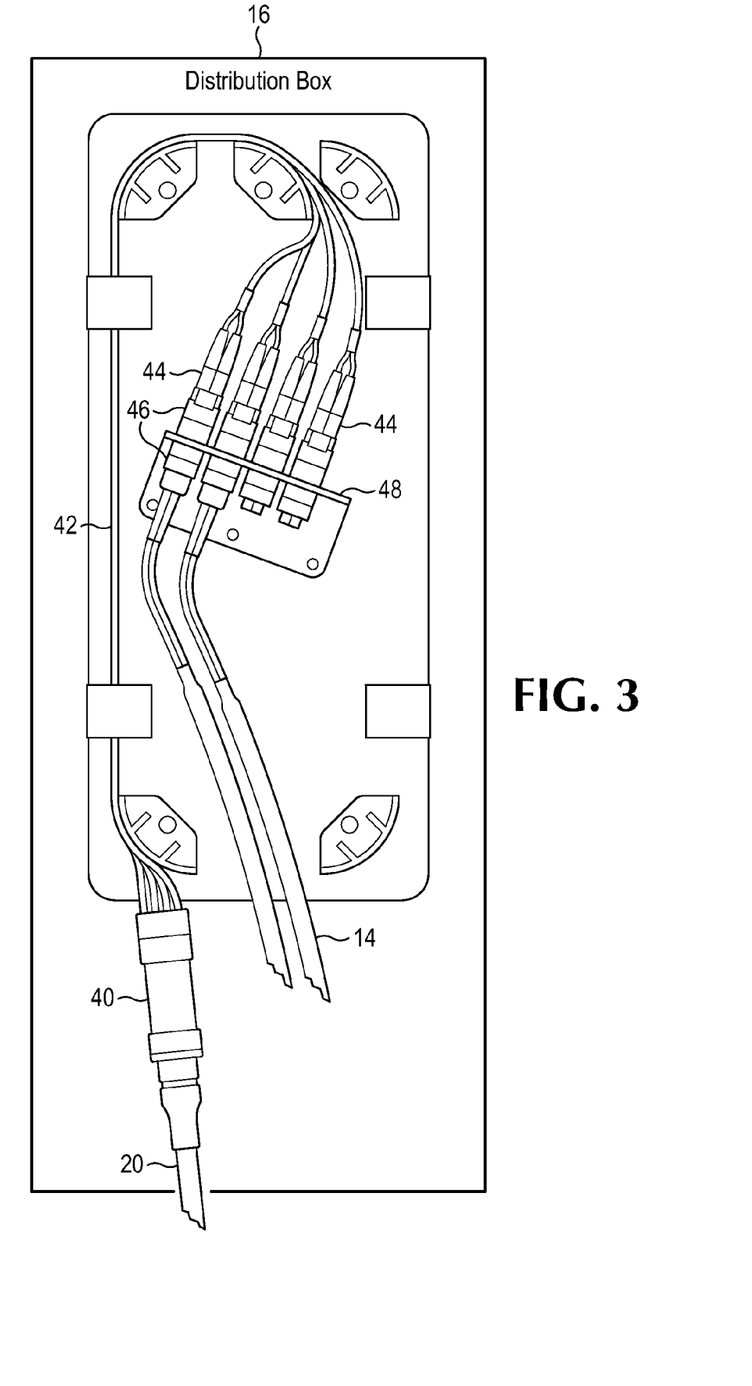
FIG. 3 shows a distribution box retaining one of the breakout assemblies.

FIG. 3 shows breakout assembly 40 located within distribution box 16. The distal end of fiber optic cable 20 extends up into a bottom end of distribution box 16. Breakout assembly 40 separates out optical fibers from fiber optic cable 20 into separate furcation tubes 42. Fiber optic connectors 44 connect to the ends of the optical fibers and snap into first ends of adapters 46 that seat into a connector tray 48. First ends of fiber jumper cables 14 connect into second ends of adaptors 46 in connector tray 48. Second ends of fiber jumper cables 14 connect to the radios 12 shown above in FIG. 1.

Figure 4:
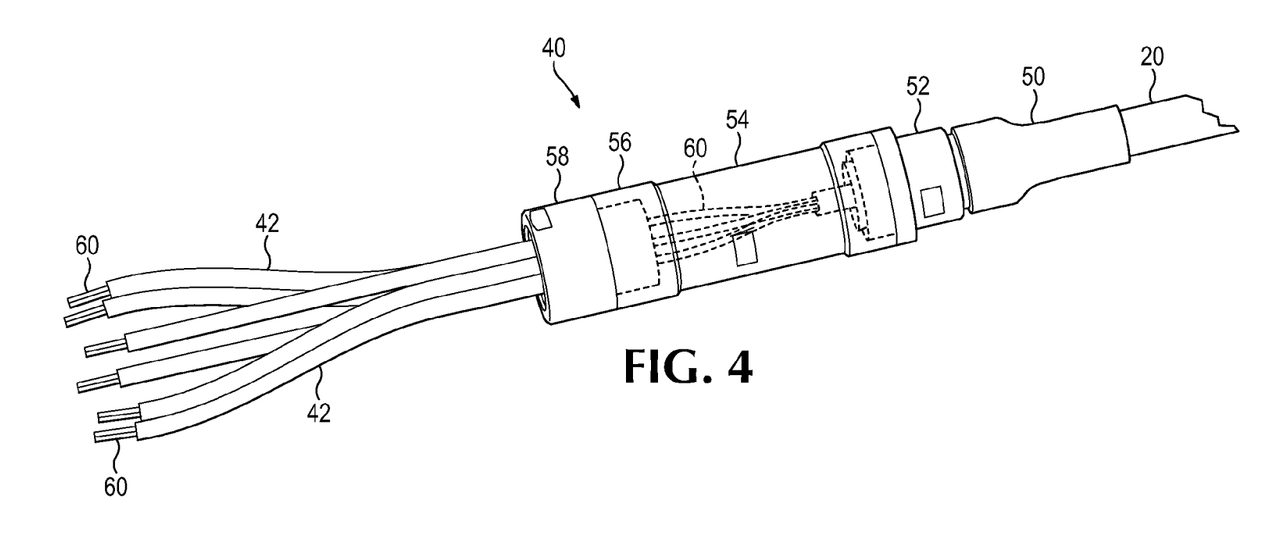
FIG. 4 shows a breakout assembly in more detail.

FIG. 4 shows breakout assembly 40 in more detail. Breakout assembly 40 separates pairs of optical fibers 60 from multi-fiber optic cable (trunk cable) 20. In one example, breakout assembly 40 includes a clear transparent plastic cylindrical housing 54 with openings at opposite ends. A first end of housing 54 provides an entry point for fiber optic cable 20 and a second end of housing 54 provides an exit point for the individual pairs of optical fibers 60 through furcation tubes 42.

Breakout assembly 40 includes a heat shrink cover 50 that extends over a first end of a cylindrical retaining member 52. First end of housing 54 attaches to a second end of retaining member 52 and a second end of housing 54 attaches to a nut 58. A breakout head 56 is held into the second end of housing 54 by nut 58. Pairs of optical fibers 60 are inserted through holes in breakout head 56 and into furcation tubes 42.

Figures 5A, 5B:
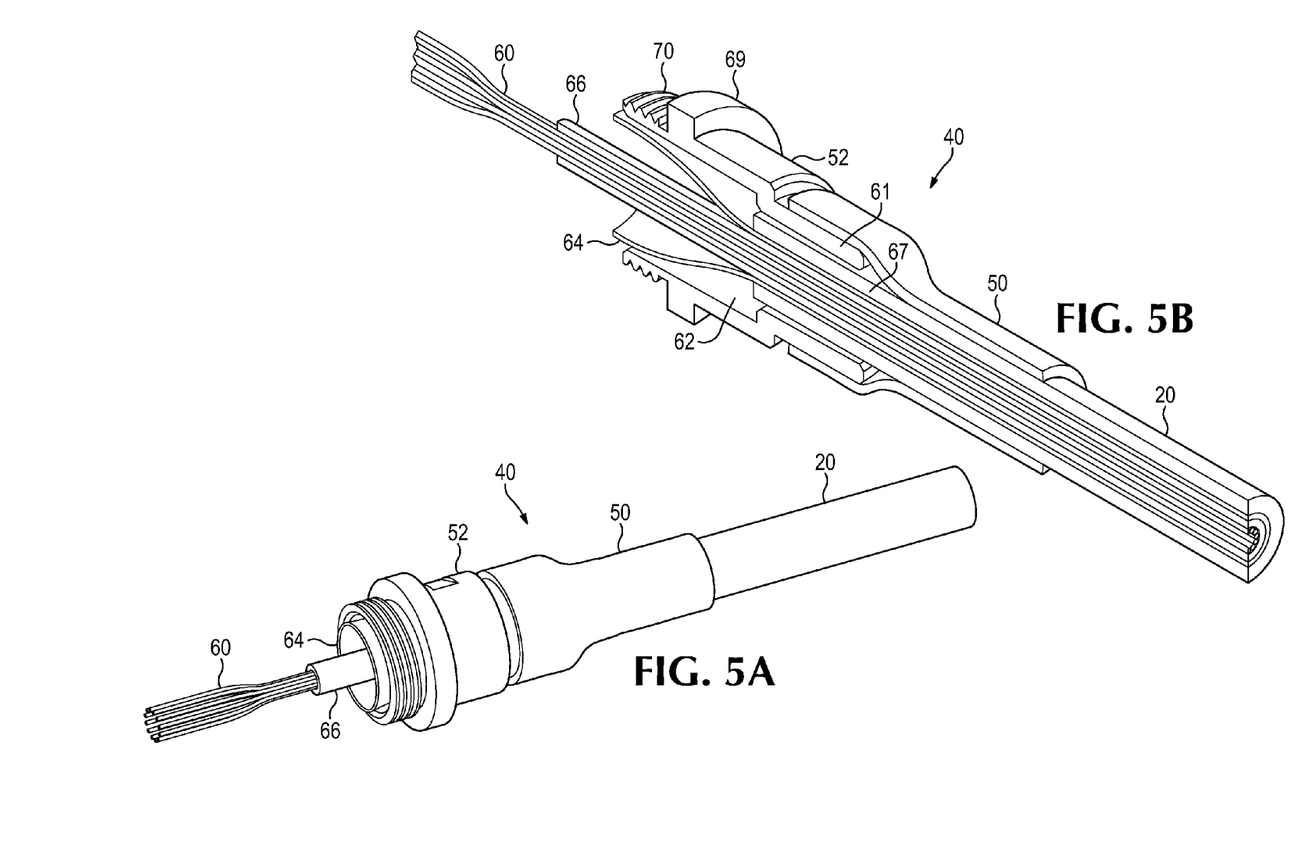
FIGS. 5A and 5B show a retaining member of the breakout assembly in more detail.

FIG. 5A is a perspective view of retaining member 52 and FIG. 5B is a sectional perspective view of retaining member 52. Referring to FIGS. 5A and 5B, fiber optic cable 20 is inserted through a tubular front section 61 that extends out a first end of retaining member 52. Front section 61 extends around the outside of fiber optic cable 20 and heat shrink cover 50 firmly fixes front section 61 to cable 20.

A second larger diameter cylindrical opposite end 70 of retaining member 52 includes a threaded outside surface. A lip 69 extends radially out around end 70 behind the threaded surface. Fiber optic cable 20 is stripped to a predetermined length exposing a strengthening member 64, tube 66, and optical fibers 60. In one example, strengthening member 64 comprise glass yarn, aramids, or any other protective sheathing.

An exterior insulation cover 67 of cable 20 is stripped and the end positioned at the bottom of a chamber 62 formed in end 70. Strengthening member 64 is exposed and spread out against the inside walls of chamber 62. Tube 66 is stripped to extend partially out of chamber 62 exposing optical fibers 60. An epoxy is inserted into inner chamber 62 holding and partially encapsulating strengthening member 64, tube 66, optical fibers 60, and the optical cable.

Figures 6A, 6B:
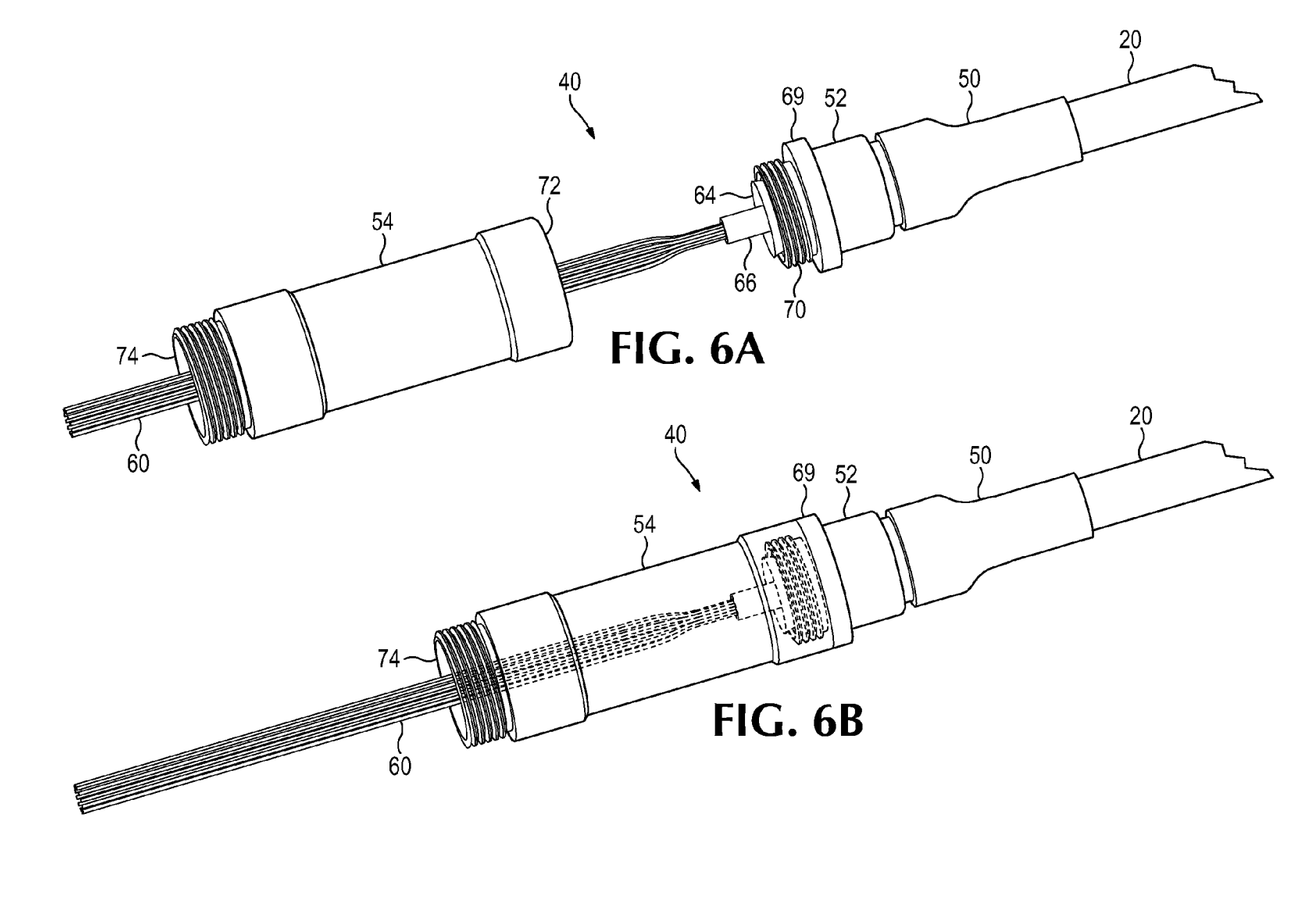
FIGS. 6A and 6B show a housing attached to the retaining member of FIGS. 5A and 5B.

FIG. 6A is an exploded perspective view of retaining member 52 and housing 54 and FIG. 6B is an assembled perspective view of retaining member 52 and housing 54. Referring to FIGS. 6A and 6B, fiber optic cable 20 is stripped exposing optical fibers 60, tube 66 and strengthening member 64 as described above in FIGS. 5A and 5B. Optical fibers 60 are inserted into a first end 72 of housing 54 and feed out through a second end 74 of housing 54.

First end 72 of housing 54 includes a threaded inside surface that threadingly engages with the threaded male outside surface formed on end 70 of retaining member 52. Housing 54 is screwed over end 70 of retaining member 52 as shown in FIG. 6B covering tube 66 and strengthening member 64. Housing 54 is screwed into threaded end 70 of retaining member 52 until first end 72 of housing 54 presses against lip 69. Lip 69 and first end 72 of housing 54 have substantially a same outside circumference forming a sealed abutment.

Figures 7A, 7B:
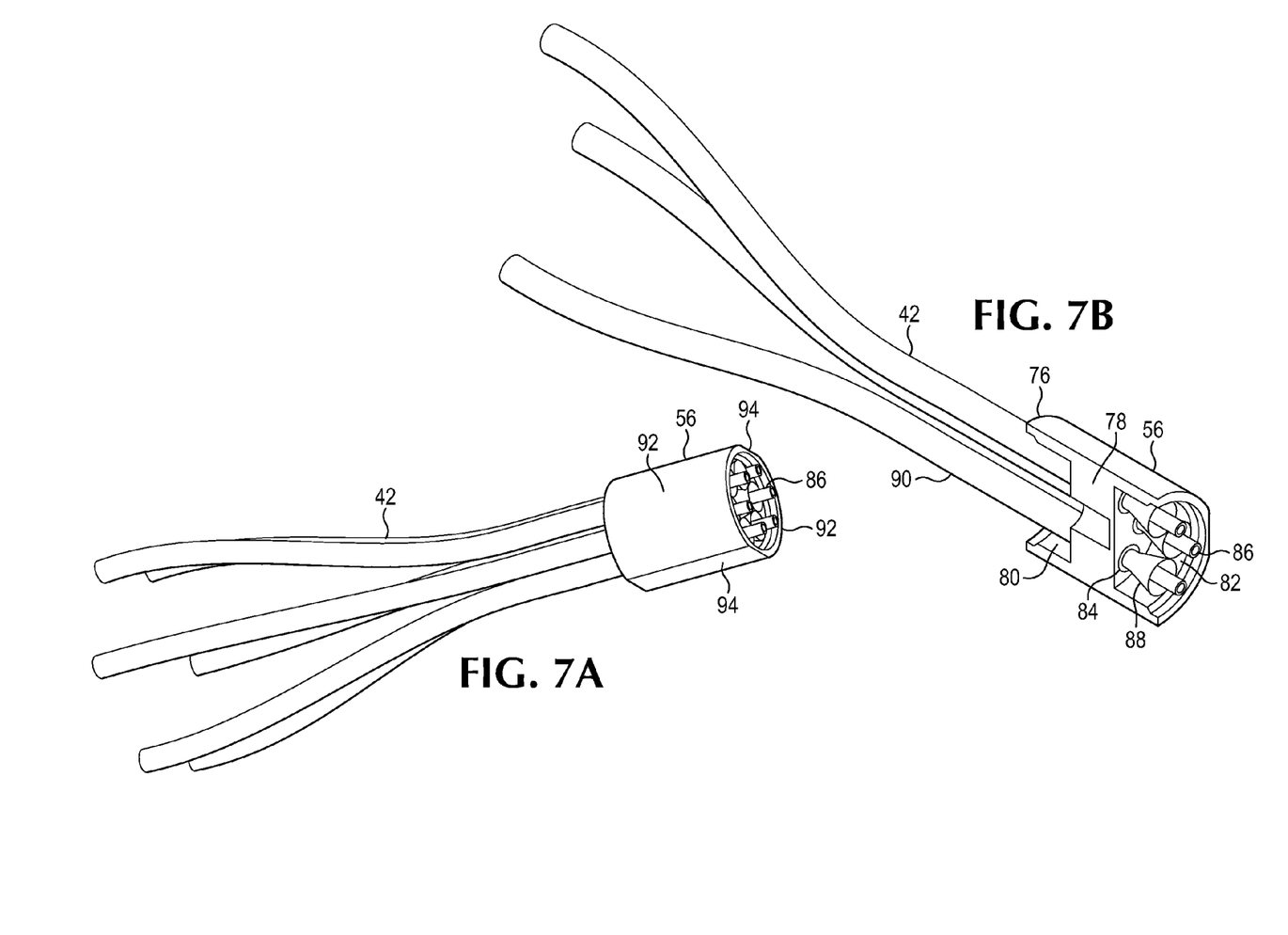
FIGS. 7A and 7B shows a breakout head of the breakout assembly in more detail.

FIG. 7A shows a perspective view of breakout head 56 and FIG. 7B shows a sectional perspective view of breakout head 56. Referring to FIGS. 7A and 7B, breakout head 56 includes a casing 76 configured to insert into housing 54 as shown below in FIG. 8. A divider 78 extends across an inside surface of casing 76. Holes 84 extend through divider 78 and are configured to retain furcation tubes 42. Casing 76 includes two substantially round outer walls 92 and two substantially flat walls 94 extending between the two substantially round walls 92.

A first inner chamber 80 is formed in a first end of casing 76 and a second inner chamber 82 is formed in a second end of the casing 76. Furcation tubes 42 are inserted into chamber 80, through holes 84, and out through the bottom of chamber 82. External insulation layers 90 of furcation tubes 42 are stripped to a predetermined length exposing strengthening members 88 and tubes 86.

In one example, strengthening members 88 are similar to strengthening member 64 in cable 20 of FIG. 5B and also may comprise a glass yarn, aramids, or some other type of protective sheathing. An epoxy is inserted into chambers 80 and 82 elastically holding and encapsulating portions of strengthening members 88 and tubes 86.

Figure 8:
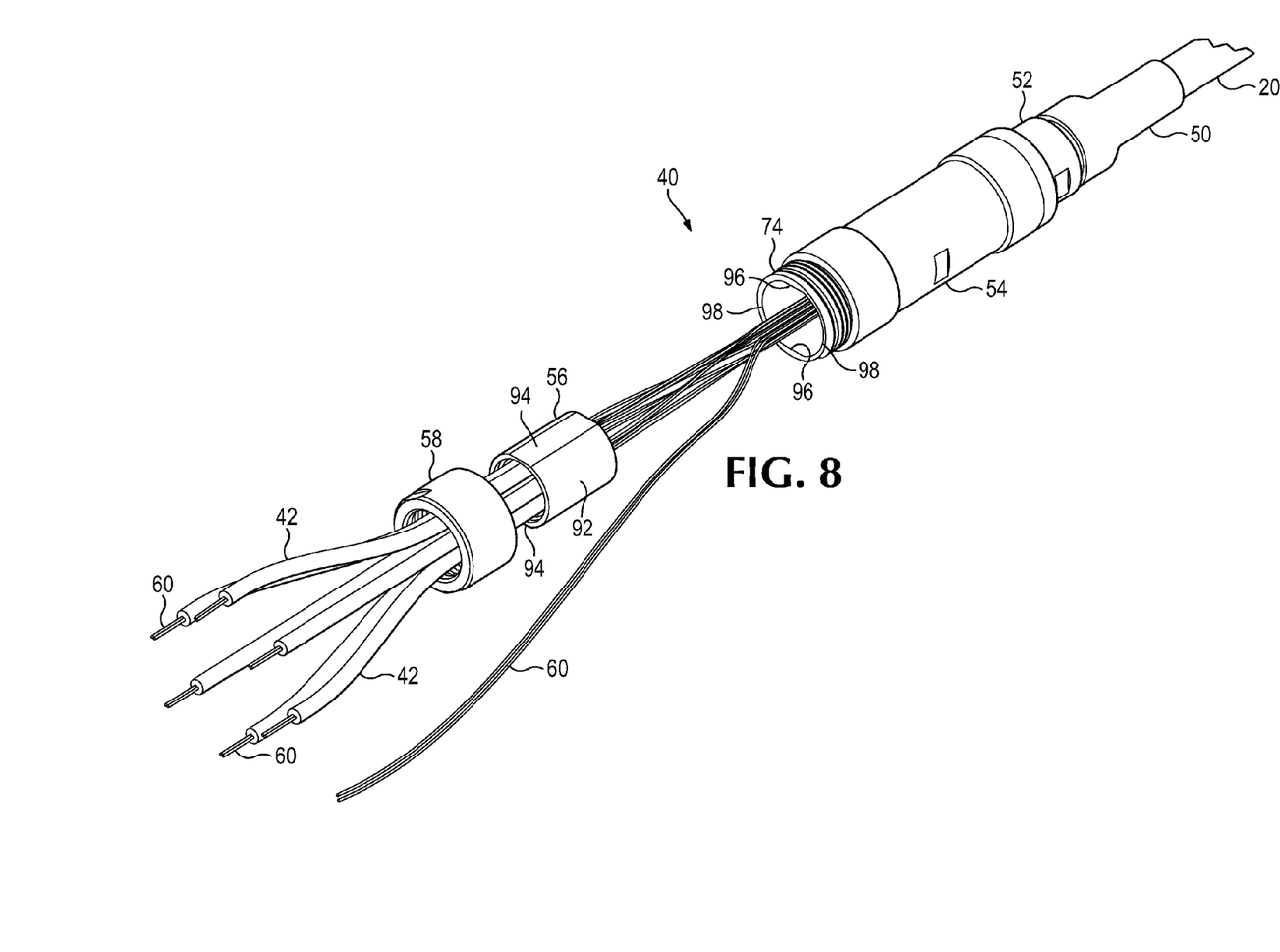
FIG. 8 shows an exploded view of a housing, breakout head, and nut of the breakout assembly.

FIG. 8 shows an exploded perspective view of breakout head 56 in breakout assembly 40. Second end 74 of housing 54 includes a threaded outside surface configured to threadingly engage with threads formed on an inside surface of nut 58. Second end 74 also to has flat double D round inner walls 98 and flat inner walls 96 that extend between round walls 98. Flat inner walls 96 slide over and against corresponding flat outer walls 94 formed on an outside surface of breakout head 56.

Optical fibers 60 are inserted in pairs though the holes formed in breakout head 56 and through furcation tubes 42. Breakout head 56 is slid into second end 74 of housing 54 with outside walls 92 and 94 aligning with inside walls 98 and 96 of housing 54, respectively. Nut 58 is then screwed over the threaded outside surface of second end 74 holding breakout head 56 inside of housing 54.

Each furcation tube 42 may contain 2 optical fibers 60. Since radio 12 in FIG. 1 is connected to duplex connectors, the proposed configuration reduces the footprint of breakout head 56 and facilitates fiber matching according to international standards. The double D design of inside walls 96 and 98 in housing 54 and outside walls 94 and 92 on breakout head 56 also prevents microbending and twisting of optical fibers 60 inside of breakout assembly 40. The circular shape of breakout head 56 also enables smooth breakout from fiber optic cable 20. The transparent plastic tube used for housing 54 enables the visual control of optical fibers 60 during the manufacturing process and after the installation has been completed.

Figure 9:
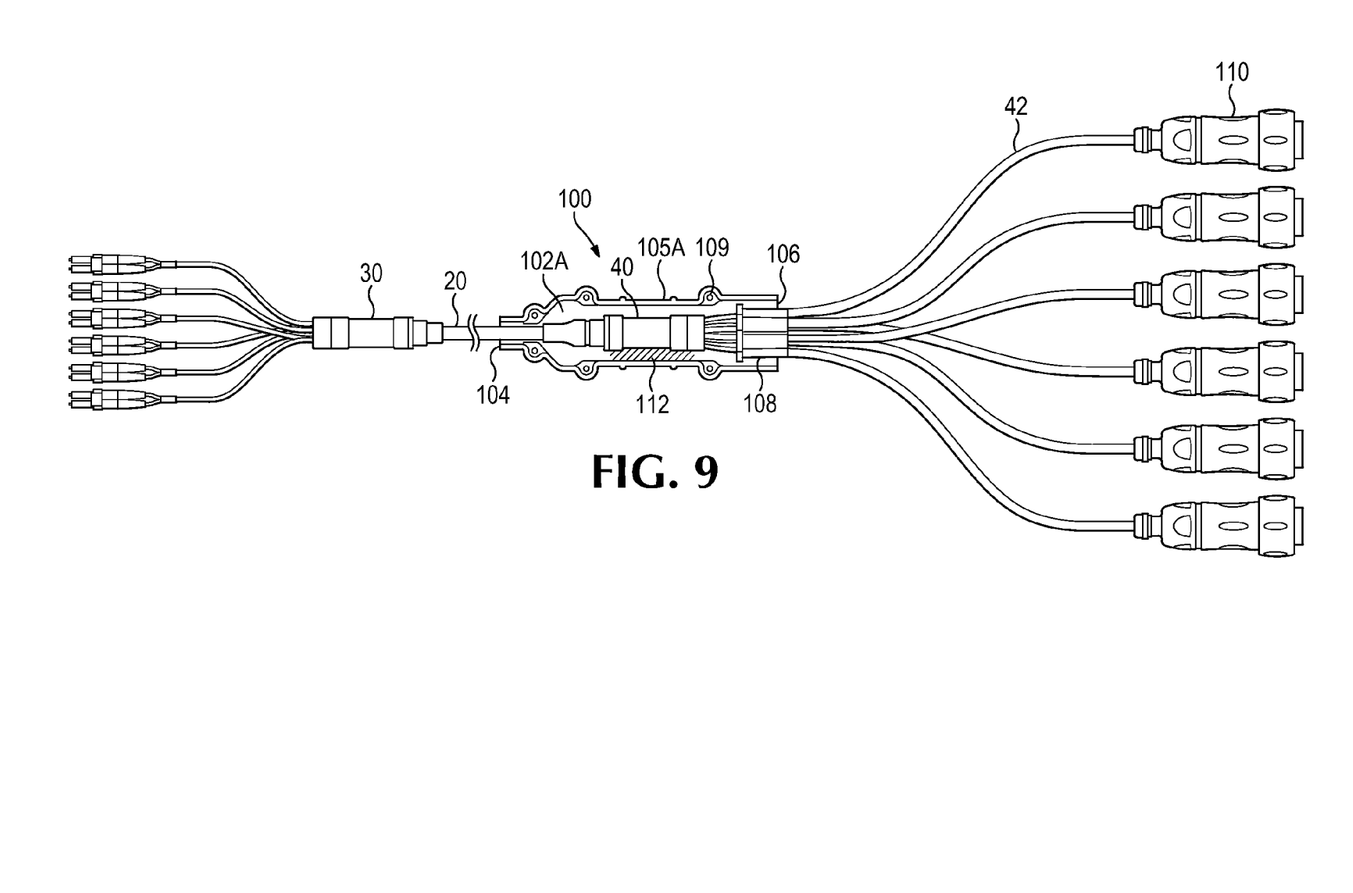
FIG. 9 shows a side transparent view of an enclosure retaining the breakout assembly.
Figure 10:
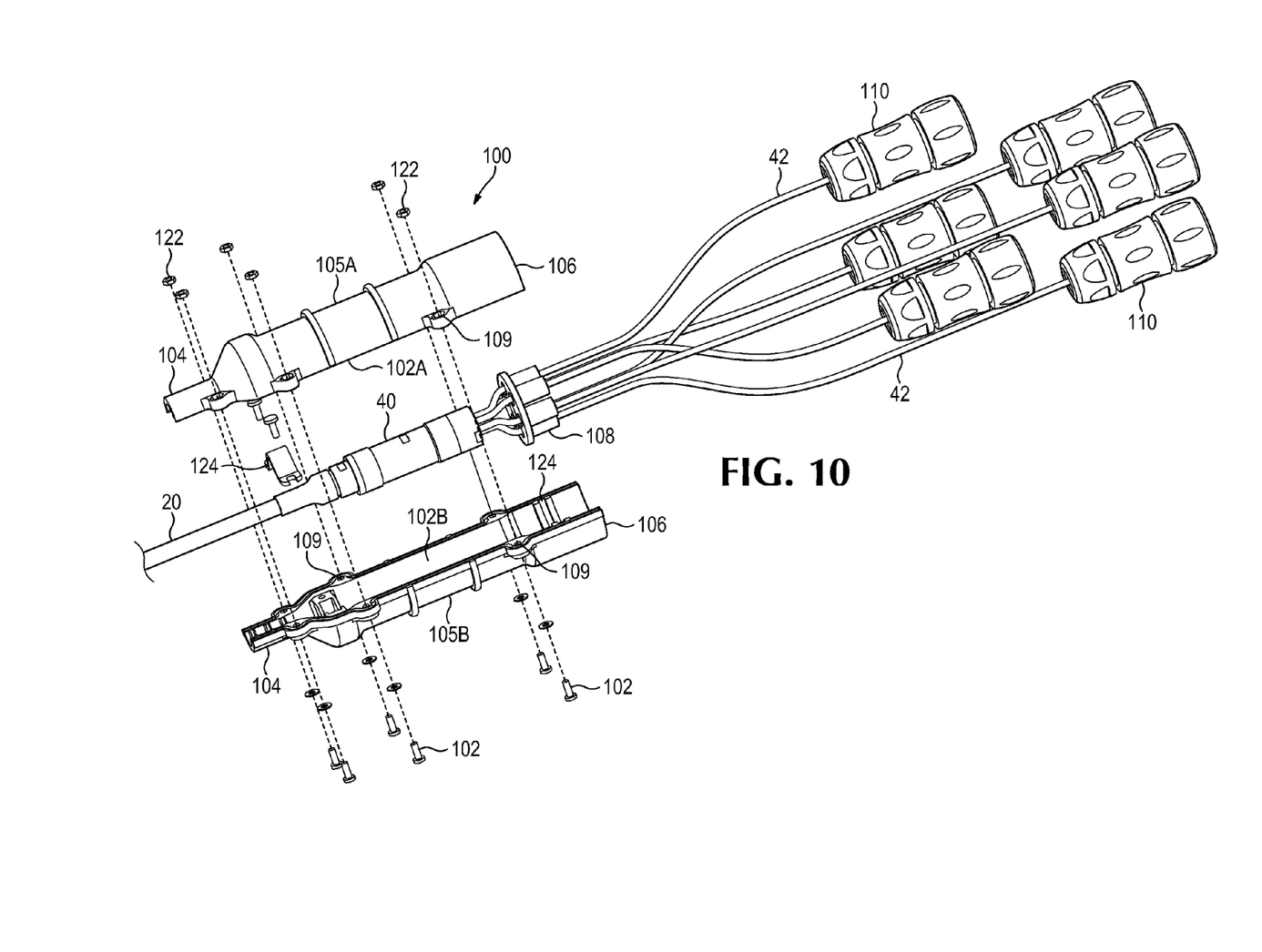
FIG. 10 shows a perspective exploded view of the enclosure shown in FIG. 9.

FIGS. 9 and 10 depict one example of an enclosure 100 retaining breakout assembly 40. FIG. 9 is a side view of one half of enclosure 100 and FIG. 10 shows an exploded perspective view of enclosure 100.

Enclosure 100 provides a weather resistant barrier encapsulating breakout assembly 40 and allowing breakout assembly 40 to be located in external locations outside of distribution box 16 (see FIG. 1). For example, breakout assembly 40 and enclosure 100 may be located on the top of tower 18 proximate to radios 12. In one example, enclosure 100 is made out of plastic.

Enclosure 100 includes two sections 105A and 105B that together form a tubular first end 104 and a tubular second end 106. First ends 104 receive fiber optic cable 20 and second ends 106 retain a set of tubes 108 that receive furcation tubes 42. Tubular first end 104 wraps around and against cable 20 and tubular second end 106 includes a channel 124 for retaining a round base that supports multiple individual tubes 108.

Breakout assembly 40 is placed in an inner chamber 102A formed in section 105A of housing 100. In one example, a sealing-potting material 112 is inserted in chamber 102A in between the breakout assembly 40 and the inside wall of section 105A. Sealing-potting material 112 also may be inserted into chamber 102B of section 105B. Second section 105B of housing 100 is placed against first section 105A covering up breakout assembly 40. The sealing-potting material 112 spreads throughout chamber 102A/102B encapsulating an entire outside surface of breakout assembly 40 in between breakout assembly 40 and the inside surface of housing 100.

Holes 109 are formed on sides of sections 105A and 105B. Attaching section 105B over section 105A aligns holes 109. Sections 105A and 105B are held firmly held together with bolts 120) that insert through holes 109 and screw into nuts 122. A clamp 124 screws into holes formed inside of chamber 102B firmly holding cable 20 in section 105B.

Sections 105A and 105B form a substantially round outside circumference that extends around breakout assembly 40 from a front end of breakout assembly 40 to a back end of breakout assembly 40. First section 105A and second section 105B form a substantially cylindrical inner chamber 102A/102B configured to retain sealing-potting material 112 for encapsulating breakout assembly 40. Enclosure 100 is configured for retaining a form factor for one individual breakout assembly 40.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A breakout assembly, comprising:
 a housing;
 a retaining member to attach longitudinally to a first end of the housing and receive a fiber optic cable; and
 a breakout head longitudinally insertable into and through a second end of the housing, the breakout head including multiple holes to retain furcation tubes through the second end of the housing and pass individual pairs of optical fibers from the fiber optic cable through the furcation tubes, wherein the breakout head includes front and back inner chambers each filled with epoxy to encapsulate and hold the individual furcation tubes inside of the holes in the breakout head.

2. The breakout assembly of claim 1, wherein:
 the housing comprises a round tube formed from a unitary piece of material; and the retaining member is configured to screw into the first end of the round tube.

3. The breakout assembly of claim 1, wherein the retaining member is further configured to:
 retain in an inner chamber a first insulation layer of the fiber optic cable that encases the optical fibers;
 retain in a second strengthening layer of the fiber optic cable wrapped around the first insulation layer and radially spread out within the inner chamber; and
 retain a third outside insulation layer of the fiber optic cable wrapped around the second strengthening layer that terminates at a bottom end of the inner chamber.

4. The breakout assembly of claim 1, wherein the retaining member includes an inner chamber filled with an epoxy to encapsulate and hold the fiber optic cable within the retaining member.

5. A breakout assembly, comprising:
 a housing;
 a retaining member configured to attach to a first end of the housing and receive a fiber optic cable; and
 a breakout head insertable into a second end of the housing including multiple holes configured to retain furcation tubes through the second end of the housing and pass optical fibers from the fiber optic cable through the furcation tubes, wherein:
 the breakout head includes a round casing with substantially round outer side surfaces and substantially flat outer top and bottom surfaces and a round divider that extends across the casing and includes the multiple holes; and
 the second end of the housing includes substantially round inner side surfaces, and substantially flat inner top and bottom surfaces configured to slidingly receive the breakout head.

6. The breakout assembly of claim 1, including a nut configured to hold the breakout head inside the second end of the housing.

7. The breakout assembly of claim 6, wherein the nut includes a threaded inside surface configured to threadingly engage with a threaded outside surface formed on the second end of the housing.

8. The breakout assembly of claim 1, wherein the housing includes a threaded inside surface on the first end for threadingly engaging with an outside surface formed on the retaining member and a threaded outside surface on the second end for threadingly engaging with a threaded inside surface of a nut configured to retain the breakout head within the second end of the housing.

9. The breakout assembly of claim 1, wherein the housing comprises a substantially transparent plastic tube.

10. The breakout assembly of claim 1, further comprising an enclosure including a first section and a second section forming a substantially round outside circumference that extends around the breakout assembly from a front end of the breakout assembly to a back end of the breakout assembly.

11. The breakout assembly of claim 10, wherein the first and second section form a substantially cylindrical inner chamber configured to retain the breakout assembly and retain a sealing-potting material for encapsulating the breakout assembly.

12. A fiber optic breakout head, comprising:
 a round casing;
 a round divider that extends across the casing;
 holes extending through the divider configured to retain furcation tubes and receive different optic fibers from a fiber optic cable through the furcation tubes; and
 two substantially round outer sidewalls and two substantially flat outer top and bottom walls extending between the two substantially round sidewalls.

13. A fiber optic breakout head, comprising: a casing configured to insert into a breakout assembly housing;
 a divider that extends across the casing;
 holes extending through the divider configured to retain furcation tubes and receive different optic fibers from a fiber optic cable through the furcation tubes;
 a first inner chamber formed in a first end of the casing for receiving the furcation tubes; and
 a second inner chamber formed in a second end of the casing, wherein:
 first exposed insulation layers of the furcation tubes are configured to extend out through the second inner chamber;

second exposed strengthening layers of the furcation tubes are wrapped around the first insulation layers and spread out inside of the second inner chamber; and third external insulation layers of the furcation tubes are wrapped around the second strengthening layers and terminate at a bottom end of the second inner chamber.

14. The breakout head of claim 13, wherein the first and second inner chamber are each configured to retain an epoxy for elastically encapsulating individual portions of the furcation tubes.

15. The breakout head of claim 12, wherein the round outer sidewalls and two substantially flat outer top and bottom walls insert inside of corresponding round inner sidewalls and two substantially flat inner top and bottom walls inside of a breakout assembly housing.

16. A breakout assembly, comprising:
a housing including a first end and a second end;
a retaining member including a first end to receive a fiber optic cable and a second end attaching to the first end of the housing and retaining exposed stripped layers of the fiber optic cable;
a breakout head configured to insert into the second end of the housing, the breakout head including holes for receiving furcation tubes with different optical fibers from the fiber optic cable, wherein the breakout head includes front and back inner chambers each filled with epoxy to encapsulate and hold the individual furcation tubes inside of the holes.

17. The breakout assembly of claim 16, wherein:
the first end of the housing includes a threaded inside surface for screwing over an outside threaded surface of the retaining member; and
the second end of the housing includes a threaded outside surface for screwing into an inside threaded surface of a nut to hold the breakout head inside of the second end of the housing.

18. The breakout assembly of claim 16, wherein:
the housing, retaining member, and breakout head all have elongated substantially tubular shapes and the retaining member attaches longitudinally to the first end of the housing and the breakout head inserts longitudinally through the second end of the housing.

19. The breakout assembly of claim 16, including an inner chamber located in the second end of the retaining member containing an epoxy for encapsulating and holding the layers of the fiber optic cable.

20. The breakout assembly of claim 16, wherein the housing comprises a substantially clear plastic tube.

21. The breakout assembly of claim 1, further comprising an enclosure including a first plastic section and a second plastic section forming a substantially round rigid outside circumference that extends around the breakout assembly from a front end of the breakout assembly to a back end of the breakout assembly.

22. The breakout assembly of claim 21, wherein the first and second section of the enclosure form a substantially cylindrical inner chamber configured to retain the breakout assembly and retain a sealing-potting material for encapsulating the breakout assembly.

* * * * *